United States Patent
Acharya et al.

(10) Patent No.: US 6,377,280 B1
(45) Date of Patent: Apr. 23, 2002

(54) EDGE ENHANCED IMAGE UP-SAMPLING ALGORITHM USING DISCRETE WAVELET TRANSFORM

(75) Inventors: Tinku Acharya, Tempe; Ping-Sing Tsai, Gilbert, both of AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/292,763

(22) Filed: Apr. 14, 1999

(51) Int. Cl.$^7$ ................................................. G06K 9/36
(52) U.S. Cl. .................. 345/667; 375/240.19; 382/248; 382/276; 345/669; 345/670; 345/671
(58) Field of Search ................................. 345/419, 667, 345/668, 609, 670, 671; 375/240.19; 382/248, 276

(56) References Cited

U.S. PATENT DOCUMENTS 6,185,254 B1 * 2/2001 Ogata ..................... 375/240.19
6,201,897 B1 * 3/2001 Nixon ......................... 382/248

* cited by examiner

*Primary Examiner*—Mark Zimmerman
*Assistant Examiner*—Kimbinh T. Nguyen
(74) *Attorney, Agent, or Firm*—Blakely, Sokoloff, Taylor & Zafman LLP

(57) ABSTRACT

A method comprising constructing virtual (Discrete Wavelet Transform) DWT sub-bands from an image by performing the DWT and then applying an inverse DWT upon the virtual sub-bands, the result of the inverse DWT representing an up-sampled version of the image. In an alternate embodiment, an apparatus comprising a computer readable medium having instructions which when executed perform constructing virtual (Discrete Wavelet Transform) DWT sub-bands from an image by performing a DWT upon the image, applying an inverse DWT upon the virtual sub-bands, the result of the inverse DWT representing an up-sampled version of the image.

36 Claims, 6 Drawing Sheets

EDGE ENHANCED IMAGE UP-SAMPLING ALGORITHM USING DISCRETE WAVELET TRANSFORM

FIELD OF THE INVENTION

The invention relates generally to image processing and computer graphics. More specifically, the invention relates to up-sampling or up-scaling of an image with embedded edge enhancement.

BACKGROUND

In the art of imaging, it may be desirable to resize an image. Particularly, it may be desirable to scale up (up-sample) an image to make it larger if the image is too small for its intended use or application. For instance, a digital camera may capture an image in a small size of M pixel rows by N pixel columns. If the image is to be printed, for example, it may be desirable to scale the image to R pixel rows by S pixel columns (R>M and/or S>N) such that the image covers the print area.

When an image needs to be scaled-up or up-sampled, where the image size is increased, the degradation due to blurring and blocking may be severe. For instance, consider an image that is 100 by 100 pixels in size. If an application for which the image is to be displayed is 200 by 200, then the image needs to be scaled-up by a 2:1 ratio (in both horizontal and vertical directions).

One simple and traditional way of up-sampling is to merely "duplicate" pixels as needed. In this case, since a 2:1 up-sampling is desired, each pixel could be repeated three additional times such that the information that occupied one pixel, now occupies four pixels in a two-by-two block. This "fill" approach has clear speed advantages over any other method of up-sampling since no computation or image processing is involved. However, this approach guarantees that the resulting scaled image is fuzzier, less sharp and "blocky" where individual pixel squares are more readily discernible to the eye. Importantly, the scaled result will have edge features, which are critical to human perception of any image, that are also more blocky and less sharp.

One traditional means of increasing the quality of the scaled-up image has been to use bi-linear interpolation. If a two to one up-sampling is desired then each pixel in the original image should be replaced by a block of four pixels. Consider, for example, the following original image:

$$X_A \quad X_B \quad X_C \quad \cdots$$
$$X_D \quad X_E \quad X_F$$
$$\vdots$$

A bi-linear interpolation would average in two different directions to determine the scaled image data set. The scaled image under a between interpolation method may consist of:

$$X_A \quad \frac{X_A + X_B}{2} \quad X_B \quad \frac{X_B + X_C}{2} \quad X_C \quad \cdots$$
$$\frac{X_A + X_D}{2} \quad \frac{X_A + X_B + X_D + X_E}{4} \quad \cdots$$
$$X_D \quad \frac{X_D + X_E}{2} \quad X_E \quad \cdots$$

If the original image is a size M×N, then the scaled image would be of size M*N*4 in terms of total number of pixels in the respective data sets. This and other averaging methods may yield better results than filling, but still results in blurred details and rough edges that are not smoothly contoured on the image.

Typical up-sampling techniques are inadequate and lead to poor image quality. Thus, there is a need for a up-sampling technique that better preserves image quality. Further, since lower cost of computation, in terms of complexity, is crucial in devices such as digital cameras, the up-sampling technique should also be compute efficient, so that it can be utilized in such applications.

SUMMARY OF THE INVENTION

What is disclosed is a method constructing virtual (Discrete Wavelet Transform) DWT sub-bands from an input image by performing a DWT upon the input image and applying an inverse DWT upon the virtual sub-bands, the result of the inverse DWT representing an up-sampled version of the image.

BRIEF DESCRIPTION OF THE DRAWINGS

The objects, features and advantages of the method and apparatus for the present invention will be apparent from the following description in which.

DETAILED DESCRIPTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
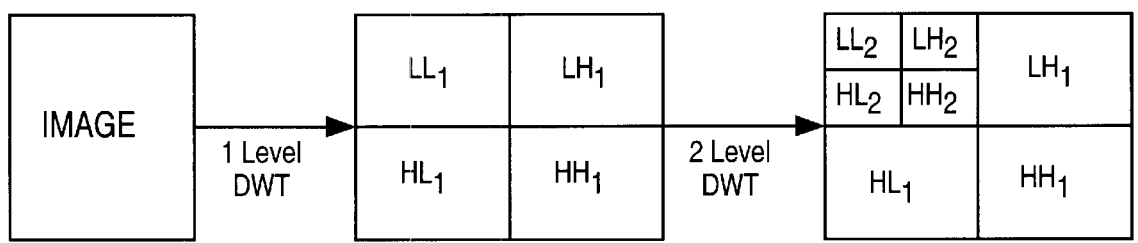
FIG. 1 illustrates the sub-band(s) resulting from a forward DWT operation upon an image.

Up-sampling of an image is achieved, according to one embodiment of the invention, by applying an inverse Discrete Wavelet Transform (DWT) upon an image after approximating values for "virtual sub-bands" belonging to the image. FIG. 1 illustrates the sub-band(s) resulting from a forward DWT operation upon an image. The DWT is a "discrete" algorithm based upon Wavelet theory which utilizes one or more "basis" functions that can be used to analyze a signal, similar to the DCT (Discrete Cosine Transform) based upon sinusoidal basis functions. Advantageously, the DWT is better suited to representing edge features in images since Wavelets by nature are periodic and often jagged. The DWT approximates an input signal by discrete samples of a full continuous wavelet. Thus, with these discrete sample points, the DWT can be thought of as also being a filtering operation with well-defined coefficients. Unlike the Fourier transforms or averaging filters, the Wavelet coefficients can be selected to suit particularly the application, or type of input signal. The DWT chosen in at least one embodiment of the invention for image scaling is known as the 9-7 bi-orthogonal spline filters DWT. Since the DWT is discrete, the DWT can be implemented using digital logic such as Very Large Scale Integration (VLSI) circuits and thus can be integrated on a chip with other digital components. Where a imaging device or camera already utilizes a DWT for image compression, an inverse DWT can easily be implemented in the same device with little additional overhead and cost. The ability of the DWT to better approximate the edge features of an image make it ideal for an up-sampling application. It is advantageous over interpolation-type scaling in that visually essential image features can be better reconstructed in the scaled-up image.

The essence of what is known commonly as a two-dimensional DWT is to decompose an input signal into four frequency (frequency refers to the high-pass (H) or low-pass (L) nature of the filtering) sub-bands. The two-dimensional DWT creates four sub-bands, LL, LH, HL and HH, with the number of data values in each one-quarter of the input data. The DWT is a multi-resolution technique such that the result data from one iteration of the DWT may be subjected to another DWT iteration. Each "level" of resolution is obtained by applying the DWT upon the "LL" sub-band generated by the previous level DWT. This is possible because the LL sub-band contains almost all essential image features and can be considered a one-quarter scaled version of the previous level LL sub-band (or the original full image in a one-level DWT). With this capability of the DWT, each sub-band can further be divided into smaller and smaller sub-bands as is desired.

Each DWT resolution level k has 4 sub-bands, $LL_k$, $HL_k$, $LH_k$ and $HH_k$. The first level of DWT resolution is obtained by performing the DWT upon the entire original image, while further DWT resolution is obtained by performing the DWT on the LL sub-band generated by the previous level k-1. The $LL_k$ sub-band contains enough image information to substantially reconstruct a scaled version of the image. The $LH_k$, $HL_k$ and $HH_k$ sub-bands contain high-frequency noise and edge information which is less visually critical than that resolved into and represented in the $LL_k$ sub-band.

In general, level K sub-band(s) have the following properties (if K=1, $LL_0$ refers to the original image):

$LL_k$—contains a one-quarter scaled version of the $LL_{k-1}$ sub-band.

$LH_k$—contains noise and horizontal edge information from the $LL_{k-1}$ sub-band image.

$HL_k$—contains noise and vertical edge information from the $LL_{k-1}$ sub-band image.

$HH_k$—contains noise and high-frequency information from the $LL_{k-1}$ sub-band image.

The property of the DWT which allows most information to be preserved in the $LL_k$ sub-band can be exploited in performing up-sampling of an image. The DWT is a unitary transformation technique for multi-resolution hierarchical decomposition which permits an input signal that is decomposed by a DWT can be recovered with little loss by performing an inverse of the DWT. The coefficients representing the "forward" DWT described above have a symmetric relationship with coefficients for the inverse DWT. Up-sampling is performed in an embodiment of the invention by considering the original input image that is to be up-sampled as a virtual LL sub-band, approximating values for the other sub-bands and then applying the inverse DWT. This is based upon the premise that an inverse DWT, when applied to the four sub-bands generated at any level will result in the recovery of the LL sub-band of the higher level from which it was resolved, or in the case of level 1 sub-bands will result in recovery of the original image. The nature of these coefficients and an architecture for carrying out an inverse DWT in order to achieve up-sampling are discussed below.

Figure 2:
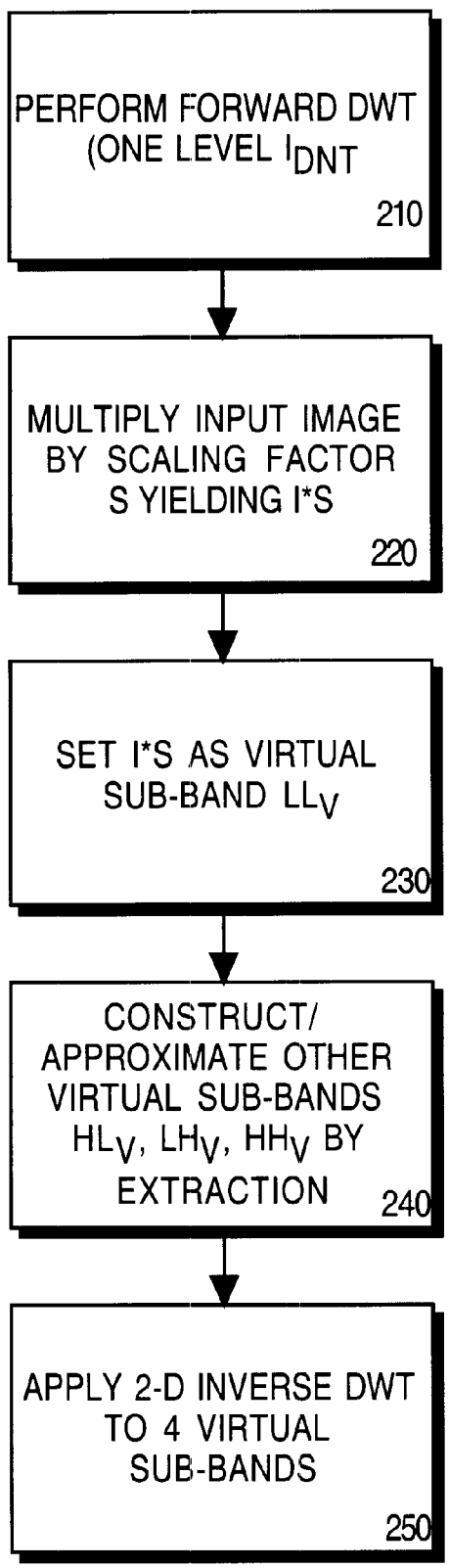
FIG. 2 is a flow diagram of edge enhanced DWT based up-sampling according to one embodiment of the invention.

FIG. 2 is a flow diagram of edge enhanced DWT based up-sampling according to one embodiment of the invention.

In edge-enhanced DWT based up-sampling, the first step is to perform a forward level one two-dimensional DWT on the input image (step 210). This results in a decomposed space $I_{DWT}$ which is utilized in constructing virtual sub-bands of a virtual space as described below. The virtual LL sub-band is constructed using the original image I. However, DWT operations result in DWT "coefficients" which may have values sharply differing in range (and precision) from intensity values for images. Thus, the original image space I should be multiplied by a set scaling factor S yielding a scaled image space I*S (step 220) if it can be used as coefficients of a DWT sub-band. The nature of this scaling factor is discussed in detail below.

If an image has M rows by N columns of pixels, then there are also M rows and N columns of values in the scaled space I*S. These M by N values are then set as the virtual LL sub-band $LL_V$ (step 230). Then, each virtual sub-band $LH_v$, $HL_v$ and $HH_v$, each of which also needs to be dimensioned to have M*N values, needs to be approximated or constructed (step 240). One way of constructing these sub-band data values, as shown below, is to extract these values from the DWT decomposed image space which contains edge information. Such considerations will result in the recovered image or higher level sub-band being nearly identical (from a human vision perspective) with its original state prior to performing the forward DWT operation. With all of the virtual sub-bands, $LL_v$, $LH_v$, $HL_v$ and $HH_v$ thus constructed, an inverse two-dimensional DWT may be performed upon the virtual sub-bands to generate the up-scaled image (step 250). The up-scaled image will exhibit better visual clarity than that available through filling, averaging or interpolation based up-sampling techniques. The up-sampling result will have M*2 rows and N*2 columns of pixel result values, which together constitute the up-sampled image.

Figure 3A:
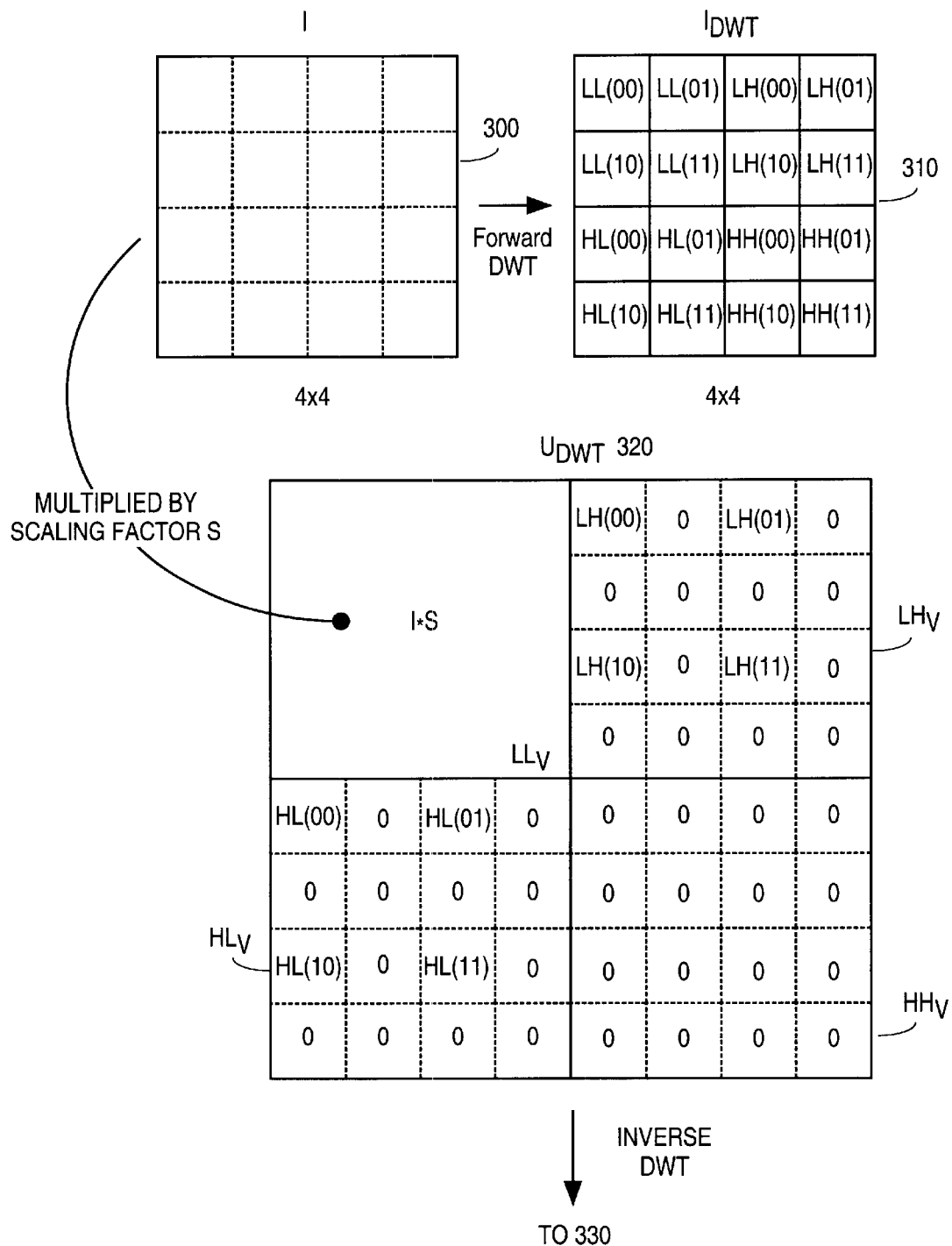
FIGS. 3(a)–3(b) illustrate edge enhanced up-sampling on a 4 by 4 image.
Figure 3B:
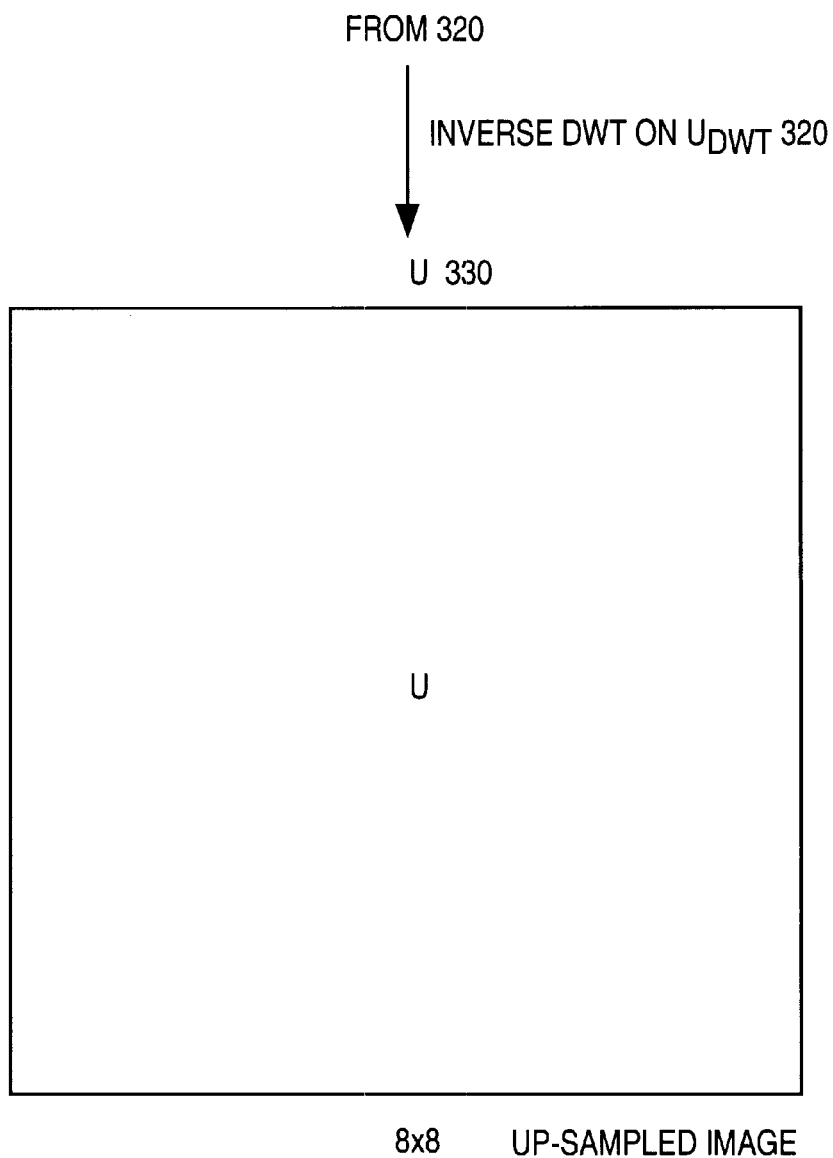

FIGS. 3(a)–3(b) illustrate edge enhanced up-sampling on a 4 by 4 image.

An original image I 300 that has 4 rows by 4 columns of pixels in its data set can be up-sampled by a factor of two to a size of 8 rows by 8 columns of pixels by following the procedure outlined in FIG. 2. The entire image data set I 300 is first decomposed using a forward 2-D DWT. This results in a 4 column by 4 row space $I_{DWT}$ 310. In accordance with DWT terminology, the original image space I 300 is decomposed into 4 sub-bands LL, HL, LH and HH. Each sub-band has one-quarter the number of values as the entire space. Thus, as shown in FIG. 3(a), the LL sub-band is composed of values LL(i,j), where i is the row number within the sub-band and j the column number. Thus, the LL sub-band has 4 values LL(0,0), LL(0,1), LL(1,0) and LL(1,1). Likewise, the HL sub-band has 4 values HL(0,0), HL(0,1), HL(1,0) and HL(1,1), the LH sub-band has values LH(0,0), LH(0,1), LH(1,0) and LH(1,1) and the HH sub-band has values HH(0,0), HH(0,1), HH(1,0) and HH(1,1). These 16 values comprise the space $I_{DWT}$. Utilizing this space and the original image (multiplied by a scaling factor S), a virtual space $U_{DWT}$ 320 can be constructed.

According to an embodiment of the invention, the original image space I multiplied by a scaling factor S will comprise the virtual sub-band $LL_v$. Each of the 16 pixels, in the example of FIG. 3(a), is thus multiplied by S. The value of S is dependent upon the characteristics of the DWT to be utilized, since many different "wavelets" are possible. In one embodiment of the invention, particularly if edge discrimination and representation is the goal, the 9-7 biorthogonal splines DWT can be utilized. With this type of DWT, analysis shows that the double low-pass nature of the LL sub-band, which the space I*S will comprise, should have an S value of essentially the square of the sum of the low-pass filter coefficients.

According to an embodiment of the invention, the data values for the other virtual sub-bands may be obtained from the forward DWT result space $I_{DWT}$. As exemplified in FIG. 3(a), the virtual sub-band $LH_v$ is constructed from the sub-band LH of the decomposed space $I_{DWT}$ and the virtual sub-band $HL_v$ is constructed from the HL sub-band of the decomposed space $I_{DWT}$. The combined data set for all four virtual sub-bands will have 8 rows and 8 columns of virtually constructed DWT coefficients. Such a virtually constructed space when subjected to a two-dimensional inverse DWT operation will yield a 2:1 up-sampled image that has 8 rows and 8 columns of pixel values. Thus, whereas each sub-band in the decomposed image $I_{DWT}$ has 2 rows and 2 columns of coefficients, those corresponding sub-bands in the virtually constructed space $U_{DWT}$ 320 need to have 4 rows and 4 columns of coefficients each. Therefore, for each coefficient of the sub-bands in $I_{DWT}$, four values must be present in the corresponding virtual sub-band of the virtual space $U_{DWT}$ 320. In order to achieve this, each coefficient in the sub-band of the decomposed space $I_{DWT}$ is repeated in the corresponding virtual sub-band as the upper left corner of block of four coefficients. The other three coefficients of each such block are set to zero. This sparse construction technique is used in constructing both the virtual sub-bands $LH_v$ and $HL_v$. According to one embodiment, the virtual sub-band $HH_v$ may have all its coefficients approximated as zero.

The 9-7 biorthogonal splines DWT has a characteristic such that even when all the coefficients of sub-bands other than the LL sub-band are set to zero, the inverse DWT will still yield a substantially accurate reconstruction of the space in its state prior to a forward DWT operation. Since the LH and HL sub-bands, in general, contain more visually important edge information than the HH sub-band, which contains a greater proportion of high-frequency noise, the HH coefficients do not need to be extracted from the decomposed space $I_{DWT}$ and thereafter repeated in constructing the corresponding virtual sub-band $HH_v$. Thus, the entire virtual sub-band HHV may be approximated to zero.

These four constructed virtual sub-bands are intended to approximate what a 2:1 up-sampled space would yield if subjected to a forward DWT. Thus, by applying an inverse 2-D DWT, the resulting space U 330 should be a visually identical up-sampled version of the original image space I 300. The up-sampled image U will have 8 rows and 8 columns of pixels that are virtually identical in terms of perception of the quality and clarity of the image when compared with the original image I. The edges of the up-sampled image U 330 are "enhanced" and much better represented than in conventional scaling techniques since edge information of the original image is included in the up-sampling by virtue of using coefficients extracted from a forward DWT of the original image space. In general, the technique exemplified above may be recursively applied to any size image, M*N, to derive any desired up-sampling ratio such as 4:1 or 8:1 which yield 4*M by 4*N and 8*M by 8*N pixels, respectively.

Figure 4:
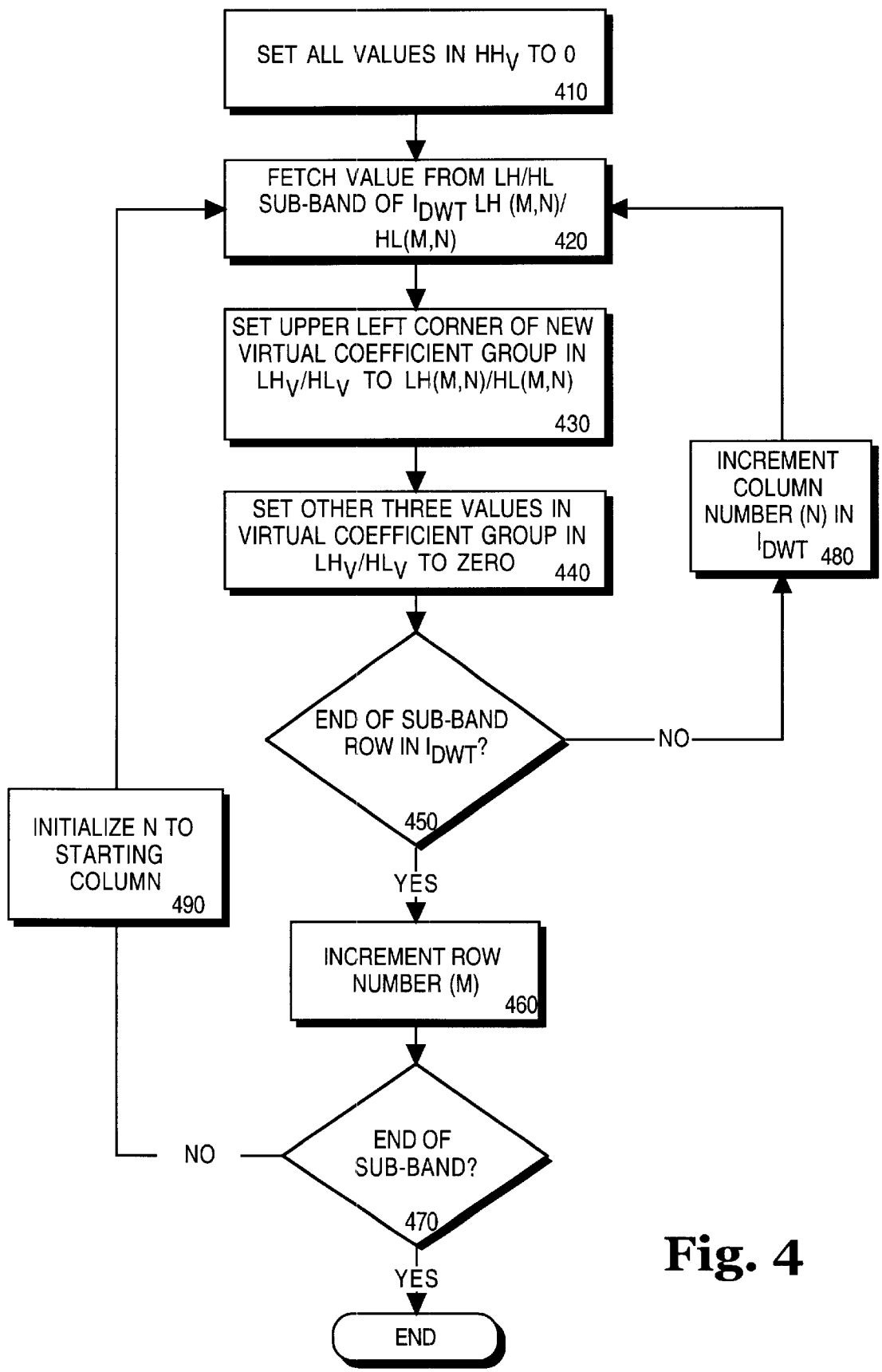
FIG. 4 shows a basic processing cell for computing a DWT operation.

FIG. 4 is a flow diagram of one embodiment of the invention.

The methodology for discrete wavelet transform (DWT) based up-sampling of an image involves extraction of certain coefficients resulting from a forward DWT of the original image. Following the example shown in FIG. 3(a), coefficient values for virtual sub-bands should first be constructed/approximated. As described above, visually acceptable results can be obtained by setting all values for the $HH_v$ virtual sub-band to 0 (block 410). The values for the $LL_v$ virtual sub-band are derived directly from the input image by multiplying each of its pixel values by a scaling factor S. For the $LH_v$ and $HL_v$ virtual sub-bands, values are extracted from the result space $I_{DWT}$ obtained by performing a forward DWT upon the image I. Since each virtual sub-band is 4 times larger than its counterpart in $I_{DWT}$ space, every four coefficients in a square configuration) is considered to be one "virtual coefficient group" for which values are constructed.

In constructing each virtual coefficient group, first, a coefficient value LH(M,N) (or HL(M,N)) is fetched from the appropriate sub-band LH (or HL) from the $I_{DWT}$ space (block 420). This fetched value LH(M,N) (or HL(M,N)) is set to be the upper left corner of each virtual coefficient group in the virtual sub-band $LH_v$ (or $HL_v$) being constructed (block 430). The other three values in that virtual coefficient group of $LH_v$ (or $HL_v$) are set to zero (block 440). The position M,N from which the real DWT coefficient was fetched in $I_{DWT}$ represents the end of the sub-band row (checked at block 450), when no more columns in that row in that sub-band can be extracted. In this case, the row number (M) is incremented (block 460). If the end of the sub-band row in $I_{DWT}$ has not been reached (checked at block 450), the column number N from which to fetch the next DWT coefficient is incremented (block 480).

When the end of a sub-band row is encountered, as mentioned above, the row number M is incremented (block 460). Before fetching further DWT coefficients, according to one embodiment of the invention, the procedure checks if the end of the sub-band in the $I_{DWT}$ has been reached (block 470). If so, the procedure is considered complete with regard to the sub-band (LH or HL) being constructed. If the end of the sub-band has not been reached, (and the end of the sub-band row has been reached) the starting column number for N is initialized (block 490). This starting column number is the first column of the sub-band. Relative to the sub-band, this starting number would be one, but in absolute terms, may be 1 or one-half of the total number of columns present in the image. Though not so indicated, each virtual sub-band ($LH_v$ and $HL_v$) is constructed by completing the sequence described in blocks 420 through 470.

For color images, such as in Bayer pattern images with separate R, G and B color planes, each color plane may be independently treated as an entire image and scaled-up separately.

Figure 5:
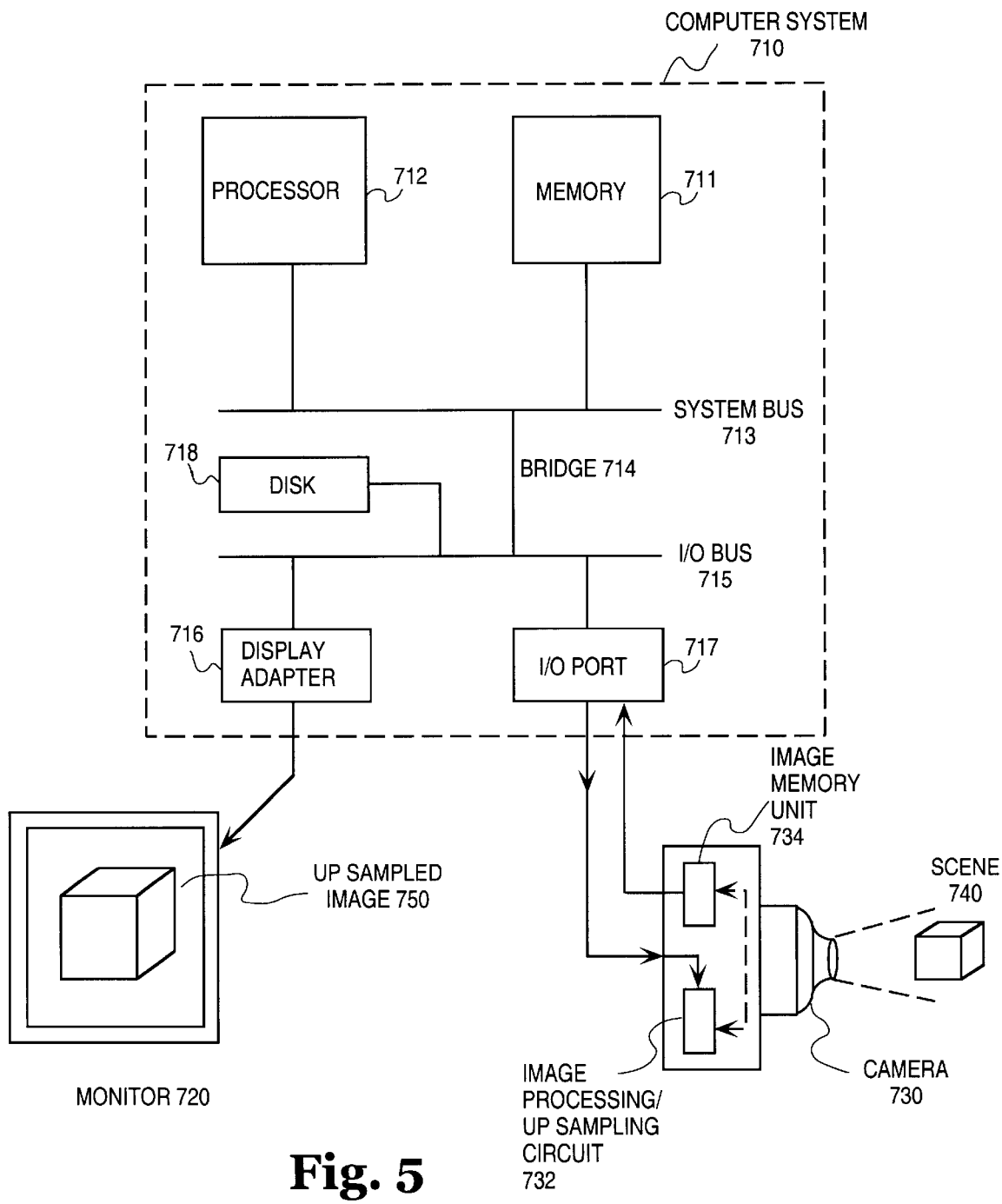
FIG. 5 is a system diagram of one embodiment of the invention.

FIG. 5 is a system diagram of one embodiment of the invention. Illustrated is a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture a sensor image of a scene 740. Essentially, captured images are processed by an image processing circuit 732 so that they can be efficiently stored in an image memory unit 734, which may be a ROM, RAM or other storage device such as a fixed disk. The image contained within image memory unit 734 that is destined for computer system 710, even if up-sampled, is enhanced in that the loss of image features due to traditional up-sampling techniques is greatly mitigated by better preserving edge features in the DWT based up-sampling process. In most digital cameras that can perform still imaging, images are stored first and downloaded later. This allows the camera 730 to capture the next object/scene quickly without additional delay. However, in the case of a digital video camera, especially one used for live videoconferencing, it is important that images not only be quickly captured, but quickly processed and transmitted out of the camera 730. The invention in various embodiments, particularly in scaling operations, is well-suited to providing good fast throughput to other parts of the image processing circuit 732 so that the overall speed of transmitting image frames is increased. Image up-sampling is carried out within the image processing circuit 732 in this embodiment of the invention. After the image is up-sampled, it may also be passed to a display system on the camera 730 such as an LCD panel, or to a display adapter 760 on the computer system. The procedure of DWT based up-sampling may be applied to any image whether captured by camera 730 or obtained elsewhere. Since the inverse and forward DWT are essentially filtering operations, one of ordinary skill in the art may program computer system 710 to perform DWT based up-sampling. This maybe achieved using a processor 712 such as the Pentium® processor (a product of Intel Corporation) and a memory 711, such as RAM, which is used to store/load instructions, addresses and result data as needed. Thus, in an alternative embodiment, up-sampling may be achieved in a software application running on computer system 710 rather than directly in hardware. The application(s) used to generate scaled-up image pixels after a download from the camera 730 may be from an executable compiled from source code written in a language such as C++. The instructions of that executable file, which correspond with instructions necessary to scale the image, may be stored to a disk 718, such as a floppy drive, hard drive or CD-ROM, or memory 711. Further, the various embodiments of the invention may be implemented onto a video display adapter or graphics processing unit that provides up-sampling or image zooming.

Computer system 710 has a system bus 713 which facilitates information transfer to/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

When an image, such as an image of a scene 740, is captured by camera 730, it is sent to the image processing circuit 732. Image processing circuit 732 consists of ICs and other components which can execute, among other functions, the scaling up of the captured or compressed image. The scaling operation, as described earlier, may utilize image memory unit to store the original image of the scene 740 captured by the camera 730. Further, this same memory unit can be used to store the up-sampled image data. When the user or application desires/requests a download of images, the scaled (and/or compressed) images stored in the image memory unit are transferred from image memory unit 734 to the I/O port 717. I/O port 717 uses the bus-bridge hierarchy shown (I/O bus 715 to bridge 714 to system bus 713) to temporarily store the scaled and compressed image data into memory 711 or, optionally, disk 718.

The images are displayed on computer system 712 by suitable application software (or hardware), which may utilize processor 712 for its processing. The image data may then be rendered visually using a display adapter 716 into a rendered/scaled image 750. The scaled image is shown as being twice the size of the original captured scene. This is desirable in many image applications where the original sensor capture size of a scene is too small. In a videoconferencing application, the image data in its compressed and scaled form may be communicated over a network or communication system to another node or computer system in addition to or exclusive of computer system 710 so that a videoconferencing session may take place. Since up-sampling and compression are already achieved on-camera in one embodiment of the invention, it may be possible to implement a communication port in camera 730 that allows the image data to be transported directly to the other node(s) in a videoconferencing session. Wherever a user of computer system 710 also desires to see his own scene on monitor 720, image data that is scaled-up may be sent both to computer system 710 and transported over a network to other nodes. As discussed earlier, the scaled image will have more visually accurate edge features than typical in scaling operations due to the enhancement in the scaling process by specifically and carefully selecting DWT coefficients. The end result will be a higher quality rendered up-sampled image 750 being displayed onto monitor 720 or other nodes in a videoconferencing session as compared with even typical up-sampling methods.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
constructing virtual (Discrete Wavelet Transform) DWT sub-bands from an input image by performing a two-dimensional DWT upon said input image, said virtual sub-bands including an LL virtual sub-band, an HL virtual sub-band, an LH virtual sub-band and an HH virtual sub-band, each sub-band consisting of the same number of coefficients as there are pixels in said input image, said virtual LL sub-band having coefficients that repeat all pixels of said input image as multiplied by a scaling factor, said scaling factor being the square of the sum of the low-pass filter coefficients of the DWT utilized; and
applying an inverse two-dimensional DWT upon said virtual sub-bands, the result of said inverse two-dimensional DWT representing an up-sampled version of said image.

2. A method according to claim 1 wherein said virtual HH sub-band coefficients are approximated to zero values.

3. A method according to claim 1 wherein said constructing virtual sub-bands includes:
performing a forward DWT upon said input image, said forward DWT resulting in four input image DWT sub-bands LL, HL, LH and HH.

4. A method according to claim 3 wherein said constructing virtual sub-bands includes:
constructing coefficients for said virtual LH sub-band; and
constructing coefficients for said virtual HL sub-band.

5. A method according to claim 4 wherein said constructing coefficients for said virtual LH sub-band includes:

fetching a value from said input image DWT LH sub-band;

setting the upper left corner of a virtual coefficient group to be the fetched value; and setting all other locations in said virtual coefficient group to zero.

6. A method according to claim 4 wherein said constructing coefficients for said virtual HL sub-band includes:

fetching a value from said input image DWT HL sub-band;

setting the upper left corner of a virtual coefficient group to be the fetched value; and setting all other locations in said virtual coefficient group to zero.

7. A method according to claim 5 further wherein said constructing coefficients for said virtual LH sub-band includes:

repeating fetching, setting the upper left corner and setting all other locations for all values in said input image DWT LH sub-band.

8. A method according to claim 6 further wherein said constructing coefficients for said virtual HL sub-band includes:

repeating fetching, setting the upper left corner and setting all other locations for all values in said input image DWT HL sub-band.

9. An apparatus comprising a computer readable medium having instructions stored thereon which when executed cause:

constructing virtual (Discrete Wavelet Transform) DWT sub-bands from an input image by performing a DWT upon said input image, said virtual sub-bands including an LL virtual sub-band, an HL virtual sub-band, an LH virtual sub-band and an HH virtual sub-band, each sub-band consisting of the same number of coefficients as there are pixels in said input image, said virtual LL sub-band having coefficients that repeat all pixels of said input image as multiplied by a scaling factor, said scaling factor being the square of the sum of the low-pass filter coefficients of the DWT utilized; and applying an inverse DWT upon said virtual sub-bands, the result of said inverse DWT representing an up-sampled version of said image.

10. A system comprising:

a memory configured to store image and DWT result data; and a processor coupled to said memory, said processor configured by instructions loaded in said memory to construct virtual sub-band input data from said image data, said virtual sub-bands including an LL virtual sub-band, an HL virtual sub-band, an LH virtual sub-band and an HH virtual sub-band, each sub-band consisting of the same number of coefficients as there are pixels in said input image, said virtual LL sub-band having coefficients that repeat all pixels of said input image as multiplied by a scaling factor, said scaling factor being the square of the sum of the low-pass filter coefficients of the DWT utilized; and to perform an inverse DWT upon said input data generating an up-sampled image therefrom.

11. A system according to claim 10 wherein said processor is configured to couple to an imaging device.

12. An apparatus according to claim 10 wherein said imaging device is a digital camera.

13. A method comprising:

constructing a virtual LL sub-band of a (Discrete Wavelet Transform) DWT for an up-sampled image by taking pixel values of an input image and multiplying said pixel values by a scaling factor;

constructing virtual LH, HL and HH sub-bands of a DWT for said up-sampled image; and applying an inverse DWT upon said constructed virtual sub-bands to form said up-sampled image, said up-sampled image having a greater number of pixels than said input image.

14. A method according to claim 13 wherein constructing at least one of said virtual LH, HL and HH sub-bands comprises performing a forward DWT upon said input image.

15. A method according to claim 14 wherein constructing said virtual sub-band comprises using the sub-band coefficients from said forward DWT and filling in with zeroes to obtain an appropriate number of coefficients to produce said up-sampled image.

16. A method according to claim 15 wherein said DWT sub-band coefficients form a matrix having columns and rows corresponding to columns and rows of said input image, wherein using said DWT sub-band coefficients comprises setting values of a matrix of said virtual sub-band coefficients to be equal to said DWT sub-band coefficients at regular intervals of a matrix of said virtual sub-band coefficients, said matrix of virtual sub-band coefficients having rows and columns corresponding to rows and columns of said up-sampled image, and wherein filling in with zeroes comprises setting values of said matrix of virtual sub-band coefficients to be equal to zero for values in between said regular intervals.

17. A method according to claim 13 wherein constructing at least one of said virtual LH, HL and HH sub-bands comprises assigning zeroes to all coefficients of said respective sub-band.

18. A method according to claim 13 wherein constructing said HH sub-band comprises assigning zeroes to all coefficients of said HH sub-band.

19. A method according to claim 13 wherein said virtual sub-bands consist of the same number of coefficients as there are pixels in said input image.

20. A method according to claim 13 wherein said virtual LL sub-band has coefficients that repeat all pixels of said input image as multiplied by said scaling factor.

21. A method according to claim 13 wherein said scaling factor is the square of the sum of the low-pass filter coefficients of the DWT used for applying an inverse DWT.

22. An apparatus comprising a computer readable medium having instructions stored thereon which when executed cause:

constructing a virtual LL sub-band of a (Discrete Wavelet Transform) DWT for an up-sampled image by taking pixel values of an input image and multiplying said pixel values by a scaling factor;

constructing virtual LH, HL and HH sub-bands of a DWT for said up-sampled image; and applying an inverse DWT upon said constructed virtual sub-bands to form said up-sampled image, said up-sampled image having a greater number of pixels than said input image.

23. An apparatus according to claim 22 wherein constructing at least one of said virtual LH, HL and HH sub-bands comprises performing a forward DWT upon said input image.

24. A method according to claim 23 wherein constructing said virtual sub-band comprises using the sub-band coefficients from said forward DWT and filling in with zeroes to obtain an appropriate number of coefficients to produce said up-sampled image.

25. A method according to claim 24 wherein said DWT sub-band coefficients form a matrix having columns and rows corresponding to columns and rows of said input image, wherein using said DWT sub-band coefficients comprises setting values of a matrix of said virtual sub-band coefficients to be equal to said DWT sub-band coefficients at regular intervals of a matrix of said virtual sub-band coefficients, said matrix of virtual sub-band coefficients having rows and columns corresponding to rows and columns of said up-sampled image, and wherein filling in with zeroes comprises setting values of said matrix of virtual sub-band coefficients to be equal to zero for values in between said regular intervals.

26. A method according to claim 22 wherein constructing at least one of said virtual LH, HL and HH sub-bands comprises assigning zeroes to all coefficients of said respective sub-band.

27. A method according to claim 22 wherein said virtual LL sub-band has coefficients that repeat all pixels of said input image as multiplied by said scaling factor.

28. A system comprising:
a memory configured to store image and DWT result data; and
a processor coupled to said memory, said processor configured by instructions loaded in said memory to construct a virtual LL sub-band of a (Discrete Wavelet Transform) DWT for an up-sampled image by taking pixel values of an input image and multiplying said pixel values by a scaling factor;
to construct virtual LH, HL and HH sub-bands of a DWT for said up-sampled image; and
to apply an inverse DWT upon said constructed virtual sub-bands to form said up-sampled image, said up-sampled image having a greater number of pixels than said input image.

29. A system according to claim 28 wherein constructing at least one of said virtual LH, HL and HH sub-bands comprises performing a forward DWT upon said input image.

30. A system according to claim 29 wherein constructing said virtual sub-band comprises using the sub-band coefficients from said forward DWT and filling in with zeroes to obtain an appropriate number of coefficients to produce said up-sampled image.

31. A system according to claim 28 wherein constructing at least one of said virtual LH, HL and HH sub-bands comprises assigning zeroes to all coefficients of said respective sub-band.

32. A system according to claim 28 wherein said virtual LL sub-band has coefficients that repeat all pixels of said input image as multiplied by said scaling factor.

33. A method according to claim 28 wherein said scaling factor is the square of the sum of the low-pass filter coefficients of the DWT used for applying an inverse DWT.

34. A method for doubling the number of pixels of an input image to produce an up-sampled image, comprising:
performing a DWT upon said input image;
constructing a virtual LL sub-band having coefficients that repeat all pixels of said input image as multiplied by a scaling factor;
constructing a virtual HH sub-band having all coefficients approximated to zero values;
constructing coefficients for a virtual LH sub-band by fetching a value from the input image DWT LH sub-band, setting the upper left corner of a virtual coefficient group to be the fetched value, and setting all other locations in said virtual coefficient group to zero;
constructing coefficients for a virtual HL sub-band by fetching a value from said input image DWT HL sub-band, setting the upper left corner of a virtual coefficient group to be the fetched value, and setting all other locations in said virtual coefficient group to zero; and
applying an inverse DWT upon said virtual sub-bands to form said up-sampled image.

35. A method according to claim 34 wherein each virtual sub-band consists of the same number of coefficients as there are pixels in said input image.

36. A method according to claim 34 wherein said scaling factor is the square of the sum of the low-pass filter coefficients of the DWT utilized.

* * * * *